US012579744B2

(12) United States Patent (10) Patent No.: US 12,579,744 B2
Hansen et al. (45) Date of Patent: Mar. 17, 2026

(54) 3D GLOBAL GEOSPATIAL RENDERING SERVER SYSTEMS AND METHODS

(71) Applicant: GeoFusion, Inc., Carmel, CA (US)

(72) Inventors: Paul E. Hansen, Watsonville, CA (US); Alexander Matiyevsky, Carmel, CA (US)

(73) Assignee: GeoFusion, Inc., Carmel, CA (US)

( * ) Notice: Subject to any disclaimer, the term of this patent is extended or adjusted under 35 U.S.C. 154(b) by 189 days.

(21) Appl. No.: 18/321,305

(22) Filed: May 22, 2023

(65) Prior Publication Data

US 2023/0377260 A1 Nov. 23, 2023

Related U.S. Application Data

(60) Provisional application No. 63/344,283, filed on May 20, 2022.

(51) Int. Cl.
G06T 17/05 (2011.01)
(52) U.S. Cl.
CPC .................................... G06T 17/05 (2013.01)
(58) Field of Classification Search
CPC ................................ G06T 17/05; G06T 15/10
See application file for complete search history.

(56) References Cited

U.S. PATENT DOCUMENTS 5,030,117 A * 7/1991 Delorme .............. G09B 29/007
434/153
6,618,049 B1 9/2003 Hansen 2011/0316854 A1* 12/2011 Vandrovec ............ G06T 17/205
345/420
2013/0325903 A1* 12/2013 Rohlf ...................... G06T 17/05
707/E17.044

(Continued)

FOREIGN PATENT DOCUMENTS

KR 102204031 B1 1/2021

OTHER PUBLICATIONS

Pirotti, Francesco, et al. "An open source virtual globe rendering engine for 3D applications: NASA World Wind." Open Geospatial Data, Software and Standards 2 (2017): 1-14. (Year: 2017).*

(Continued)

*Primary Examiner* — Said Broome
*Assistant Examiner* — Jordan Wan Yick
(74) *Attorney, Agent, or Firm* — POLSINELLI LLP

(57) ABSTRACT

In some embodiments, the system renders geospatial content on a digital rendering of a planet. In some embodiments, the geospatial content includes a geographical coordinate system comprising latitude lines and longitude lines in an equatorial region of a planet. In some embodiments, the geospatial content includes an array of quads at a polar region of a planet. In some embodiments, the system executes a subdivision of the digital rendering into areas. In some embodiments, a first and second area include first and second pole of the planet. In some embodiments, a third, fourth, fifth, and sixth area are rendered between the first area and the second area. In some embodiments, the geospatial content includes a geographical projection comprising an array of quads in one or more of the areas. In some embodiments, face coordinates values identify any one of the array of quads.

21 Claims, 9 Drawing Sheets

(56) References Cited

U.S. PATENT DOCUMENTS

| 2015/0355882 | A1 | 12/2015 | Ishida |
| 2020/0184719 | A1 | 6/2020 | Braybrook |
| 2021/0349922 | A1 | 11/2021 | Hsu et al. |
| 2022/0155077 | A1 | 5/2022 | Kweon |

OTHER PUBLICATIONS

R. Kooima, J. Leigh, A. Johnson, D. Roberts, M. SubbaRao and T. A. DeFanti, "Planetary-Scale Terrain Composition," in IEEE Transactions on Visualization and Computer Graphics, vol. 15, No. 5, pp. 719-733, Sep.-Oct. 2009, doi: 10.1109/TVCG.2009.43 (Year: 2009).*
International Search Report and Written Opinion in related International PCT Application No. PCT/US2023/023096 dated Sep. 1, 2023, 8 pages.

* cited by examiner

World Object Instances used for Place Names

3D GLOBAL GEOSPATIAL RENDERING SERVER SYSTEMS AND METHODS

CROSS-REFERENCE TO RELATED APPLICATION

This application claims the benefit of and priority to U.S. Provisional Application No. 63/344,283, filed May 20, 2022, entitled "3D GLOBAL GEOSPATIAL RENDERING SERVER SYSTEMS AND METHODS", the entire contents of which are incorporated herein by reference.

BACKGROUND

Global rendering of the Earth currently lacks accuracy. In the prior art, Earth data is commonly processed as a "geographic projection" that uses straight latitude and longitude references which results in the polar regions being stretched longitudinally. This geographic projection makes those regions look much bigger than they are, essentially wasting memory and making the data "unbalanced" because the latitude direction is not stretched.

Therefore, there is a need in the art for systems and methods that enable accurate representation of polar areas and geographical topology while saving memory resources.

SUMMARY

In some embodiments, the disclosure is directed to systems and methods for geospatial rendering. In some embodiments, the system comprises one or more computers comprising one or more processors and one or more non-transitory computer readable media, the one or more non-transitory computer readable media including program instructions stored thereon that when executed, cause the one or more computers to one or more steps described herein. In some embodiments, a step includes to generate, by the one or more processors, a rendering engine. In some embodiments, a step includes to generate, by the one or more processors, a content delivery module. In some embodiments, a step includes to generate, by the one or more processors, a performance module. In some embodiments, the rendering engine is configured to combine multiple image, terrain, vector, and/or annotation datasets at runtime. In some embodiments, the content delivery module is configured to display geospatial content for a planet. In some embodiments, the performance module is configured to render the geospatial content. In some embodiments, the geospatial content includes a geographical coordinate system comprising latitude lines and longitude lines in an equatorial region of a planet. In some embodiments, the geospatial content includes a geographical projection comprising an array of quads in a polar region of a planet.

In some embodiments, the geographical coordinate system is located between at least 45 degrees south of an equator of the planet and at least 45 degrees north of the equator. In some embodiments, the one or more non-transitory computer readable media include program instructions stored thereon that when executed, cause the one or more computers to generate, by the one or more processors, face coordinates. In some embodiments, the face coordinates each comprise values configured to identify any one quad of the array of quads. In some embodiments, the values include a face value, a level value, a row value, and a column value.

In some embodiments, the face value identifies one of the array of quads. In some embodiments, the level value identifies an amount of a subdivision of geographical projection. In some embodiments, the row value identifies a row of a quad face in the geographical projection. In some embodiments, the column value identifies a column of the quad face in the geographical projection.

In some embodiments, a step includes to generate, by the one or more processors, a digital rendering of a planet. In some embodiments, a step includes to generate, by the one or more processors, a subdivision of the digital rendering into areas. In some embodiments, the areas comprise a first area, a second area, a third area, a fourth area, a fifth area, and a sixth area. In some embodiments, the first area comprises a first pole of the planet. In some embodiments, the second area comprises a second pole of the planet. In some embodiments, the third area, the fourth area, the fifth area, and the sixth area are between the first area and the second area.

In some embodiments, the one or more non-transitory computer readable media include further program instructions stored thereon that when executed, cause the one or more computers to execute, by the one or more processors, a subdivision of each of the six areas into subdivision faces. In some embodiments, the system is configured execute the subdivision of each of the six areas while maintaining a substantially same area for each of the six areas on the digital rendering. In some embodiments, the one or more non-transitory computer readable media include further program instructions stored thereon that when executed, cause the one or more computers to assign, by the one or more processors, face coordinates to each of the subdivision faces. In some embodiments, each of the subdivision faces includes an array of quad faces.

In some embodiments, the face coordinates each comprise values configured to identify any one quad face of the array of quad faces. In some embodiments, the four values include a face value, a level value, a row value, and a column value. In some embodiments, the face value identifies of one of the six areas. In some embodiments, the level value identifies an amount of the subdivision of one of the six areas. In some embodiments, the row value identifies a row of a quad face in the subdivision. In some embodiments, the column value identifies a column of the quad face in the subdivision. In some embodiments, each of the four values is an integer value.

DRAWINGS DESCRIPTION

DETAILED DESCRIPTION

In some embodiments, the system includes an integrated digital planet system, also referred to as a GeoMatrix® digital planet system herein. In some embodiments, the GeoMatrix® digital planet system includes a "planet as an interface" model. In some embodiments, the GeoMatrix® digital planet system includes one or more aspects of a geospatial process. In some embodiments, a geospatial process includes one or more of a rendering engine, a projection module, a data management module, a content delivery module, a performance module, and an application programming interface (API).

In some embodiments, the rendering engine includes a 3D global geospatial rendering engine that is configured to bring together multiple image, terrain, vector, and/or annotation datasets at runtime. In some embodiments, the projection module is configured to execute dynamic terrain tessellation on a geographical projection. In some embodiments, the geographical projection includes an array of quads within a subdivision of faces on a planet surface. In some embodiments, the system includes a hybrid geospatial rendering that includes a combination of a geographical projection and a geographical coordinate system comprising latitude and longitude lines. In some embodiments, the subdivision of the faces results in quads of substantially the same area in each face. In some embodiments, a geographical coordinate system produces areas that reduces in size from the equator to a singularity at the poles. In some embodiments, the system described herein does not include a geographical coordinate system that produces areas that reduce in size from the equator to a singularity at one or more poles.

In some embodiments, the data management module is configured for high-quality processing and management of external data into the system for fast, multi-resolution tile streaming from local disk or over the internet. In some embodiments, the content delivery module is configured to display local and/or remote geospatial content. In some embodiments, the performance module is configured to deliver superior rendering performance. In some embodiments, the performance module is optimized and configured to interface with for a wide variety of hardware platforms, ranging from low-end embedded systems with limited memory and graphics resources to high-end powerhouses with multi-panel displays and multiple graphics cards. In some embodiments, the API that is designed for flexibility and scalability. In some embodiments, the API provides access to all aspects of the GeoMatrix® digital planet system via one or more programming language (i.e., C++) class libraries as well as XML, and IPC communications interfaces for plug-in modules.

Figure 1:
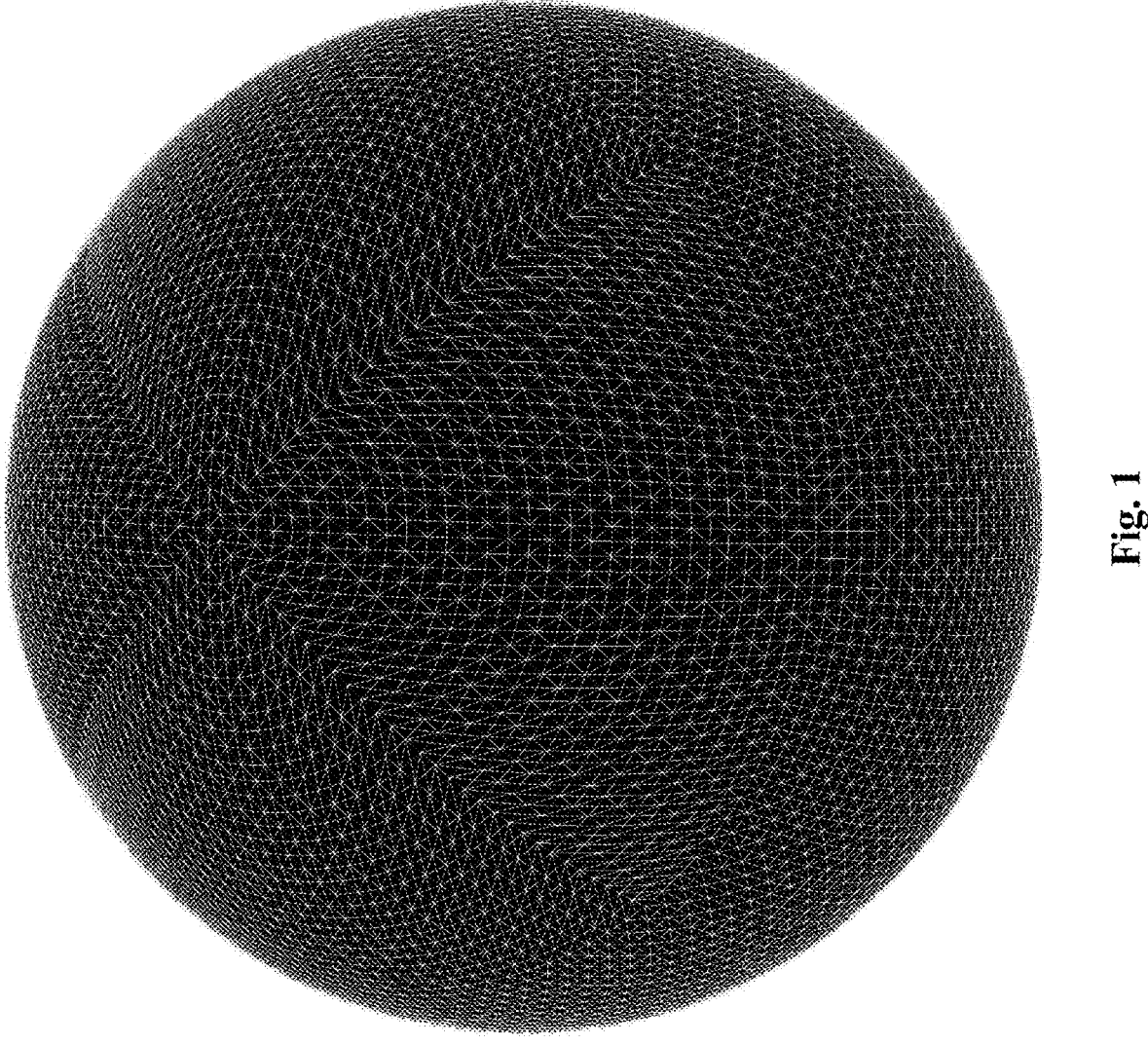
FIG. 1 shows a non-limiting example of a hybrid projection according to some embodiments.
Figure 2:
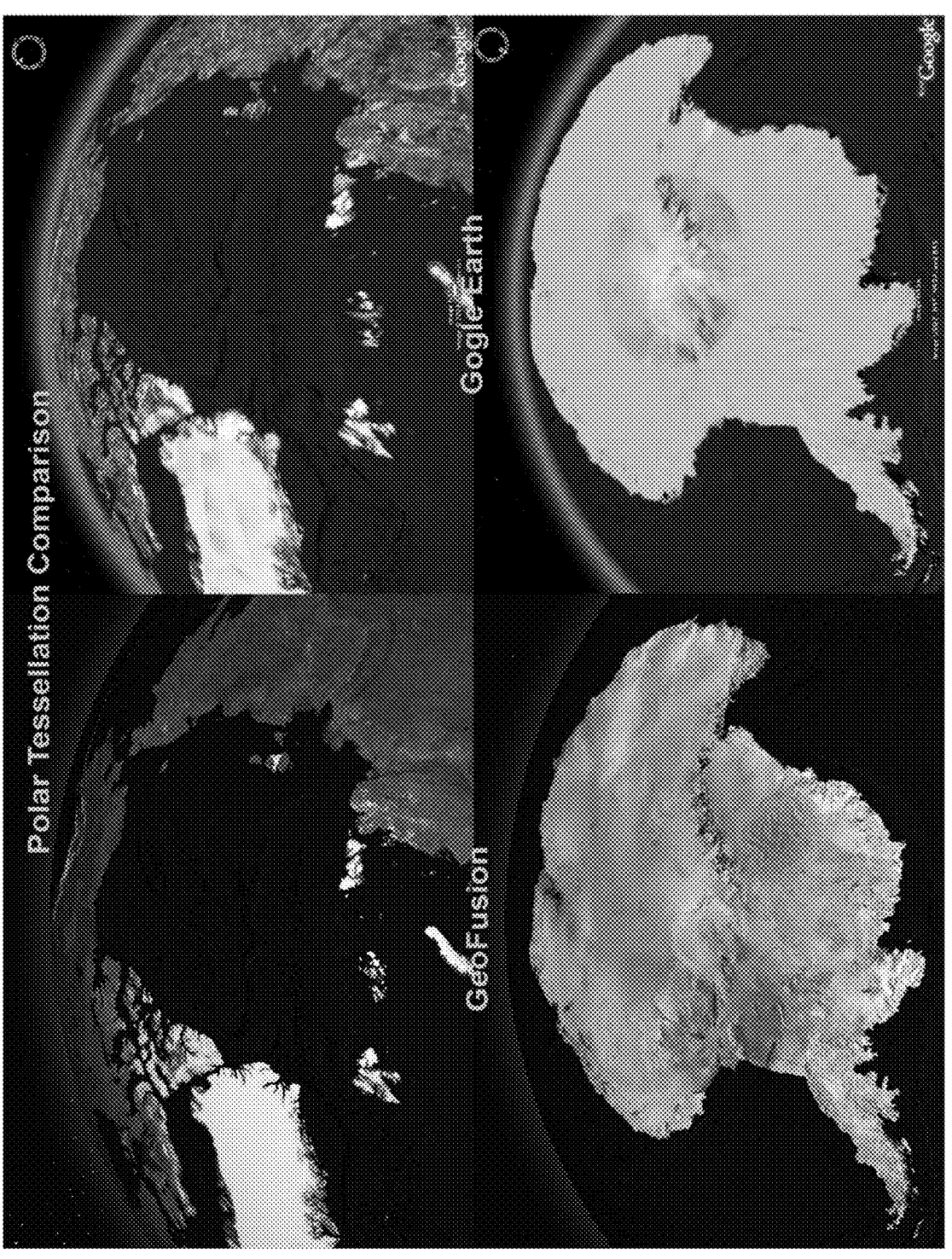
FIG. 2 shows a polar tessellation comparison between a hybrid projection (GeoFusion) according to some embodiments and a graphical projection (Google Earth®) of the prior art.
Figure 3:
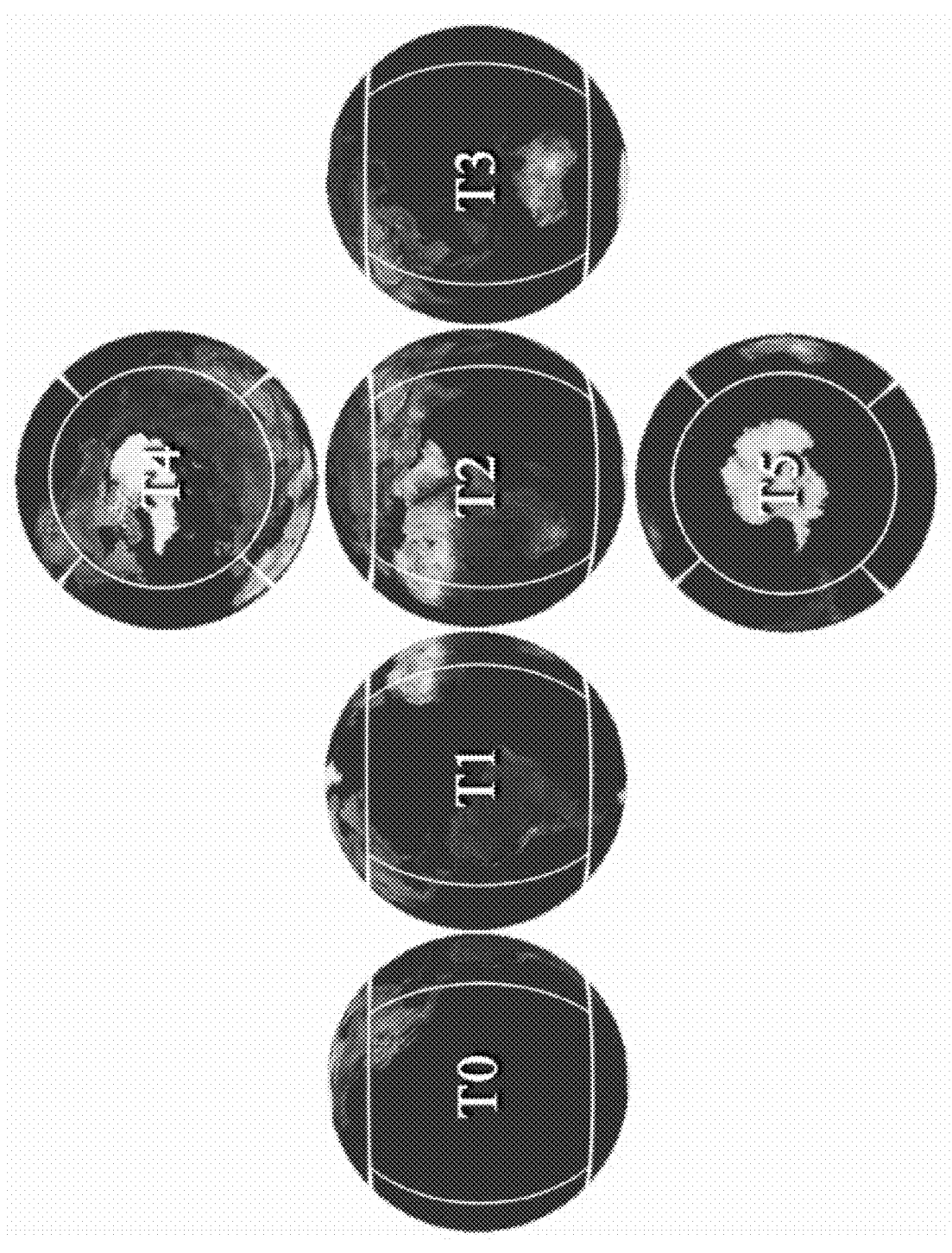
FIG. 3 shows a non-limiting example of a global tiling module output according to some embodiments.

In some embodiments, the system solves many real-world problems in the Geographic Information Sector. In some embodiments, the system includes a "hybrid" projection. In some embodiments, the hybrid projection is configured to reduce the polar distortion of the prior art. In some embodiments, the hybrid projection includes a range-based configuration wherein between −45 and +45 of a planet's latitude ("equatorial") the system is configured to use a geographic projection, and above 45 degrees north and south, a "square" polar projection is used where the latitudes are (equally) spaced quads (e.g., squares), not circles. In some embodiments, a quad includes a polygon shape defined by at least 4 vertices. In some embodiments, the polar projection does not include a spherical network of parallels and meridians Thus, in some embodiments, the system is configured to generate and/or includes poles that are not singularities. In some embodiments, the system is configured to generate a digital globe that is represented by a cube structure with each of its six sides comprising a substantially equal area (e.g., a square of 90×90 degrees). In some embodiments, the system is configured to allow the quadtree of rectilinear areas to be progressively subdivided and maintain at approximately the same area on the globe. In some embodiments, the system is configured to generate increased accuracy and information fidelity of earth polar regions as compared to the prior art which is especially important for climate change visualization. FIGS. 1 and 3 show a non-limiting example of a hybrid projection according to some embodiments. FIG. 2 shows a polar tessellation comparison between the hybrid projection (GeoFusion) and the graphical projection (Google Earth®) of the prior art.

In some embodiments, the system includes a global tiling module. In some embodiments, the global tiling module is configured to subdivide the globe into faces (e.g., 6 faces as one non-limiting example). FIG. 3 shows a non-limiting example of a global tiling module output according to some embodiments. In some embodiments, global tiling module is configured to execute one or more hybrid projection operations which result in the rendering of a globe surface at any degree of recursive subdivision in polar and equatorial globe faces. In some embodiments, the global tiling module is configured to assign face coordinates to a subdivision face. In some embodiments, face coordinates are used to identify any rectilinear (quad) area on a globe with four integers values. In some embodiments, the (four integer) values include a face value, a level value, a row value, and a column value. In some embodiments, the face value includes one of a plurality (e.g., six) globe faces. In some embodiments, the level value includes the recursion (subdivision) level. In some embodiments, within each face is a square array of quad areas where the row value and column value identify any quad. In some embodiments, effective organization and compression of data files directly translates to increase in visualization performance and improving effectiveness of user experience.

Figure 4:
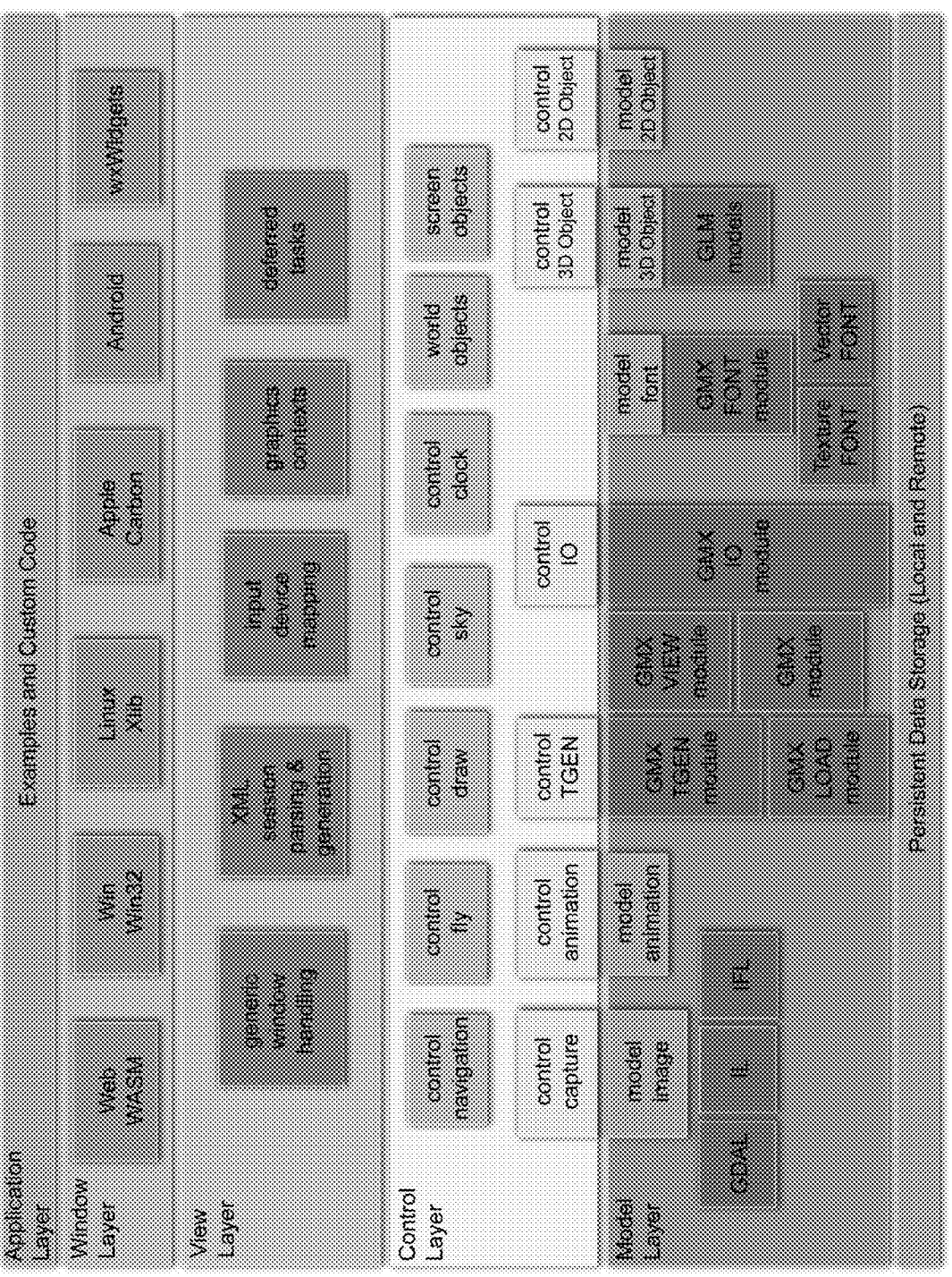
FIG. 4 shows a non-limiting example of system architecture according to some embodiments.

FIG. 4 shows a non-limiting example of system architecture according to some embodiments. In some embodiments, the system includes one or more layers (i.e., modules) configured to execute one or more submodules. In some embodiments, the system modules include one or more of a window layer, a view layer, a control layer, and a model layer. As shown in FIG. 4, in some embodiments, a non-limiting example view layer module includes a generic window handling submodule, an XML session parsing and generation submodule, an input device mapping submodule, a graphics contexts submodule, and a deferred tasks submodule. In some embodiments, a control layer module includes one or more of a control navigation submodule, a control fly submodule, a control draw submodule, a control sky submodule, a control clock submodule, a world objects submodule, a screen objects submodule, a control capture submodule, a control animation submodule, a control TGEN submodule, a control IO submodule, a control #D objects submodule, and a control 2D objects submodule. In some embodiments, the model lay module includes one or more of a model image submodule, a model animation submodule, a GDAL submodule, an IL submodule, an IFL submodule, a GMX TGEN submodule, GMX VIEW submodule, a GMX LOAD submodule, GMX submodule, a GMX IO submodule, a model font submodule, a GMX FONT submodule, a Texture FONT submodule, a Vector FONT submodule, a model 3D Object submodule, GLM submodules, and model 2D Object submodules. Other modules and submodules are shown in FIG. 4 and are part of this disclosure according to some embodiments.

In some embodiments, the system includes an object interface. In some embodiments, the object interface separates functionality into a number of library modules based on primary functions, making the system code highly organized. In some embodiments, the system is configured to play the modules seamlessly together due to a calling convention for major classes. In some embodiments, class methods can be called directly in the system software. In some embodiments, class methods can be called with XML in static session files on the internet. In some embodiments, class methods can be called with binary data communication in a high-speed network. In some embodiments, the system is configured to allow all methods of all classes to be called and controlled automatically and smoothly over time with one or more different data interpolation techniques.

In some embodiments, the object interface allows objects to be created, managed, controlled, and/or destroyed across a variety of boundaries. In some embodiments, one or more boundaries include: thread boundaries, module boundaries, process boundaries, and internet boundaries. In some embodiments, thread boundaries are configured to enable the object interface to allow an object to be affected by another thread only at a safe time. In some embodiments, module boundaries are configured to enable the object interface to provide a generic way for one module of the system to control objects in another module of the system. In some embodiments, as in the case of browser plug-in modules, as a non-limiting example, it is desirable for an application operating in any language space to be able to control a digital planet (e.g., Earth) plug-in. In some embodiments, process boundaries are configured to enable the object interface to separate processes, running either on the same machine or different machines connected across a high-speed network (e.g., a Linux cluster) to control objects via sockets or named pipes. In some embodiments, internet boundaries are configured to enable the object interface to communicate via XML across the internet to control objects in a client relationship with a server, or in peer-to-peer relationships.

The object interface is configured to enable control to be exerted in a number of ways according to some embodiments. In some embodiments, the object interface is configured to enable control to be exerted immediately, as in the case of an object that is being created and initialized before use. In some embodiments, the object interface is configured to enable control to be exerted buffered, when there is danger that the control will interfere with concurrent operations (as mentioned above).

In some embodiments, the object interface is configured to enable control to be exerted parametrically when the desired control is based on a single parameter (e.g., time). In some embodiments, the system is configured to execute one or more parametric evaluations. In some embodiments, parametric evaluations include a threshold evaluation, a linear evaluation, and a cubit spline interpolation. In some embodiments, threshold evaluation is useful for control settings that cannot be interpolated, such as Boolean or integer values. In some embodiments, threshold evaluation is also useful for situations where interpolation is not desired, such as when an object is supposed to snap immediately to a new state. In some embodiments, linear evaluation is useful for situations where an object can simply "ramp" from one state to another, such as fade-ins. In some embodiments, cubic spline interpolation is useful in cases where smoothness of control is important, such as position changes. In some embodiments, the system enables support for collaboration, remote control, and/or integration of external systems.

In some embodiments, the system includes a high-speed tile generation module for different geo-data types. In some embodiments, the tile generation module is configured to treat basic types of geospatial data in similar ways. In some embodiments, four basic types of geospatial data are collectively referred to herein as TEVA: Texture imagery, terrain Elevation, Vectors and Annotations. In some embodiments, TEVA is configured to enable the system code to be small, yet powerful, as well as help to provide a smooth and robust user experience while using other system modules. In some embodiments, increased accuracy and information fidelity directly translates to increase in visualization performance and improving effectiveness of user experience.

In some embodiments, the system includes minimum quadtree representation (MQT) module. In some embodiments, the MQT module includes a compact database that allows the runtime to quickly find which tiles exist in a database and how to find them. In some embodiments, the MQT module allows the system to run with multiple datasets at a time, allowing the user to switch them on and off and blend between them with full flexibility. Prior art systems typically require data to be "burned in" to a single database without such flexibility. In some embodiments, the benefit of a minimal representation is impressive: a 1-terabyte texture dataset with 2 million tiles in any irregular formation (sparseness) can be referenced with only 8-12 megabytes of system memory. In some embodiments, the system includes attributes such as being easily searchable while providing superior performance and data compression.

Figure 5:
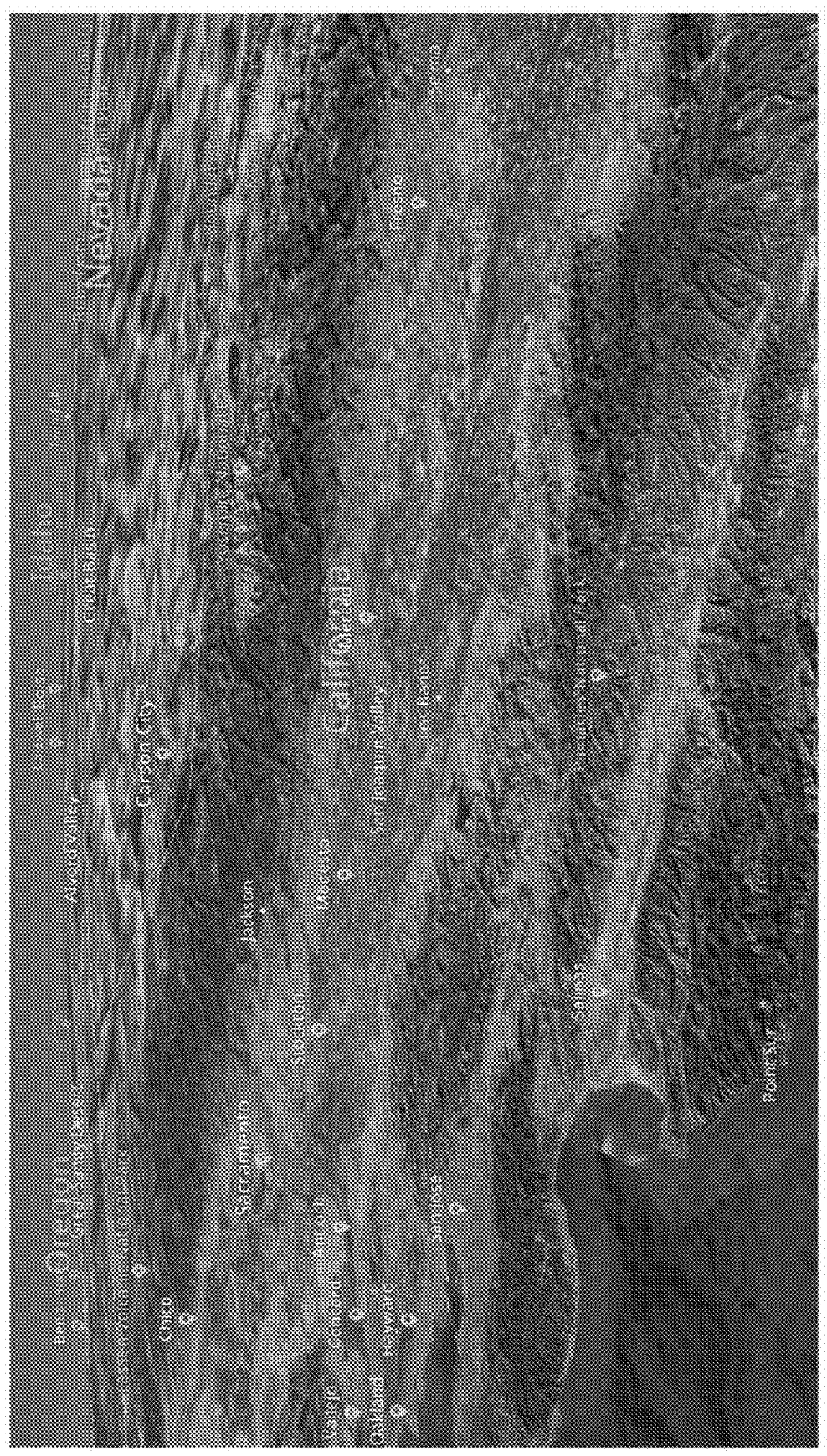
FIG. 5 depicts world object instances used for place names according to some embodiments.

In some embodiments, the system includes a world object instances module. In some embodiments, the world object instances module is configured to use lightweight graphical objects to render a vast number of objects in three-dimensional (3D) global environment without degrading performance. In some embodiments, the world object instances module is configured to display and tracking of a vast numbers of geo-referenced objects in global space in real time without jeopardizing the visualization performance, which helps to provide a smooth and robust user experience while using the system. In some embodiments, the system enables sensor/object management and tracking, a better visual live dashboard, and object intelligence that includes one object-many instances. FIG. 5 depicts world object instances used for place names according to some embodiments.

Figure 6:
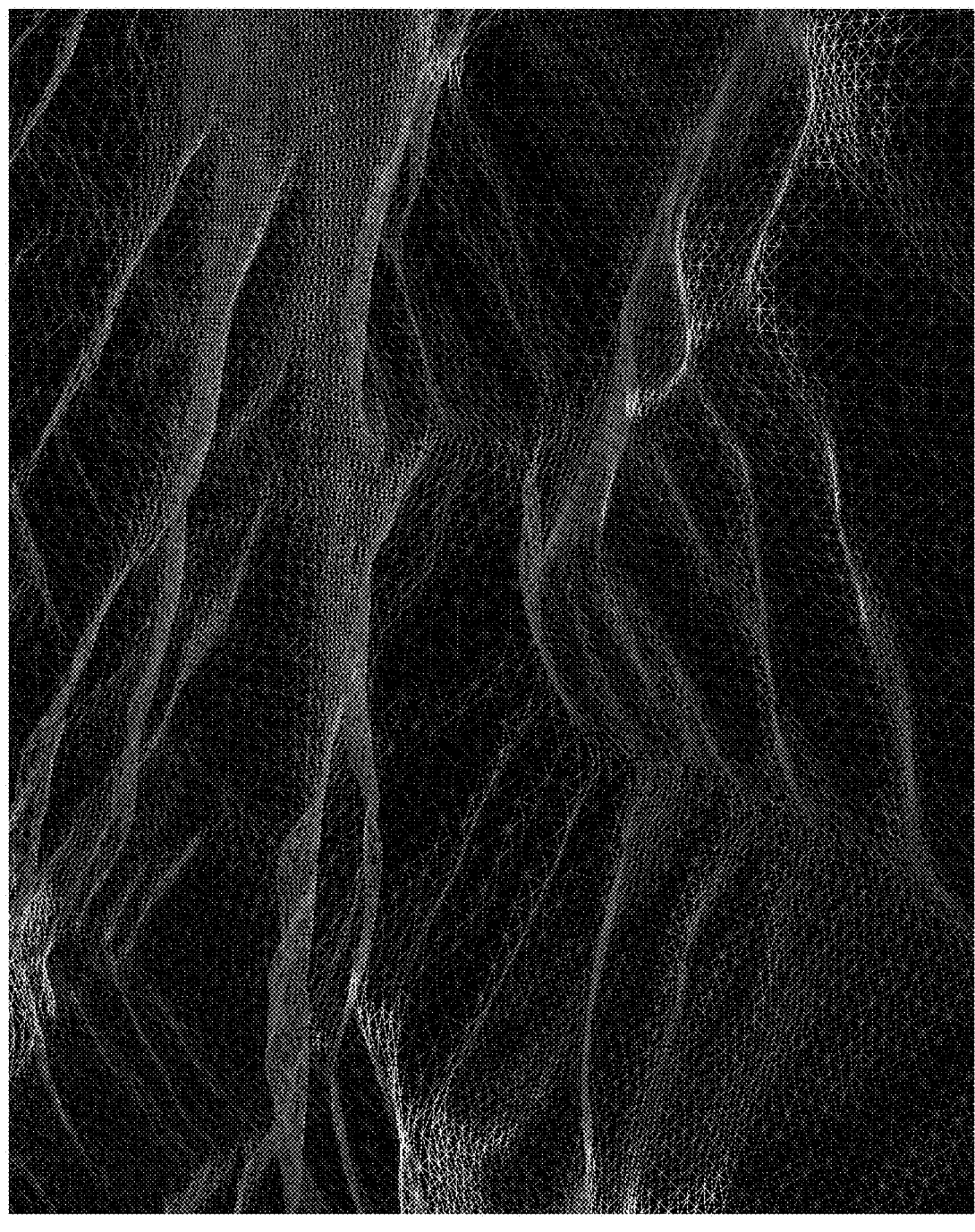
FIG. 6 depicts tessellation with different resolution levels according to some embodiments.

In some embodiments, the system includes a level-of-detail (LOD) algorithm. In some embodiments, the calculation of level-of-detail (LOD) by the system is so fast that it can be executed for every point on the globe tessellation (surrounded by four quads). In some embodiments, the LOD algorithm gives very fine control of when to stop recursion, so that switching data levels can be smooth and almost invisible. In some embodiments, the system yields superior performance for urban planning, climate risk scenarios, global multi-resolution measurement, tracking, and analysis. FIG. 6 depicts tessellation with different resolution levels according to some embodiments.

Figure 7:
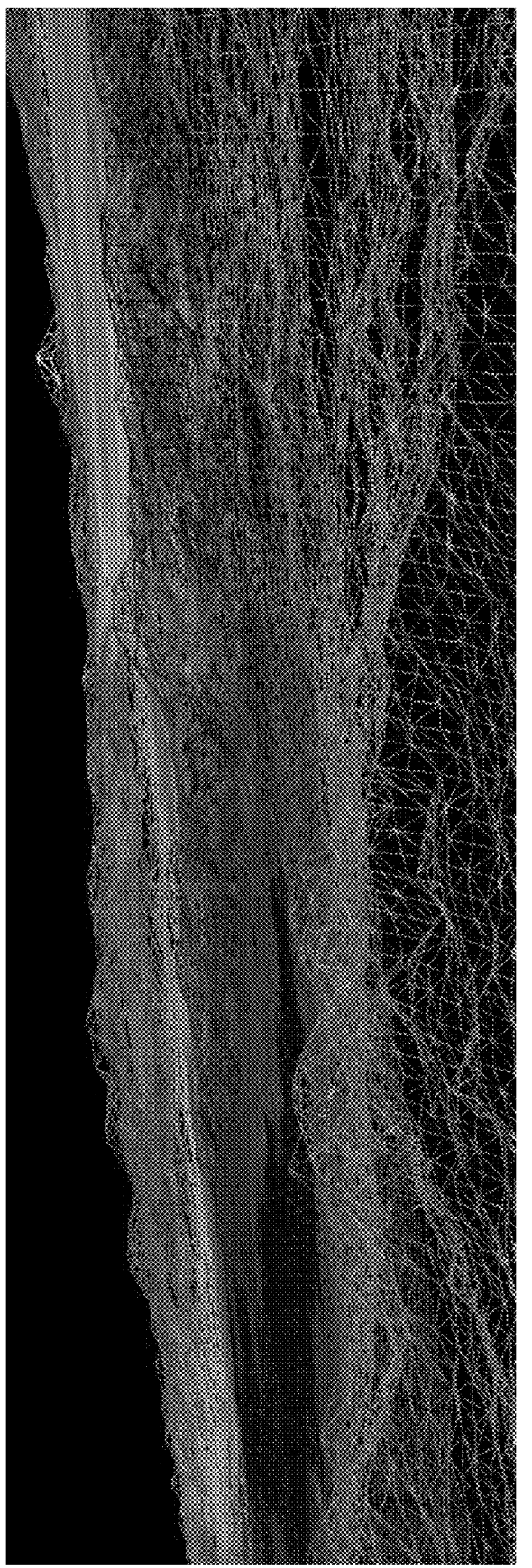
FIG. 7 illustrates terrain morphing between resolution levels according to some embodiments.

In some embodiments, the LOD algorithm is configured to enable terrain morphing between resolution levels. In some embodiments, the LOD algorithm is configured to execute fine-grained LOD calculations for morphing terrain. In some embodiments, the terrain morphing includes subdividing one or more quads into triangles. In some embodiments, morphing terrain includes when the view moves between lower and higher levels of resolution, new tessellation vertexes are first introduced by the system invisibly at the midpoints of existing edge vectors, and only gradually and smoothly are moved up or down to their correct positions by the system according to the data. In some embodiments, the system is configured to stitch together neighboring tiles of terrain data that are on different resolution levels, which would normally be mismatched and cause badly visible cracks in the globe surface in prior art systems. In some embodiments, the system enhances performance and visualization quality. FIG. 7 illustrates terrain morphing between resolution levels according to some embodiments.

In some embodiments, the system includes tile access protocol module. In some embodiments, the tile access protocol is configured to request and access data tiles from a remote server. In some embodiments, the tile access protocol module includes an Apache module that responds to requests and manages any number of GMX datasets located on that server. In some embodiments, on the local side, the tile access protocol module includes a caching system that can manage varying amounts of memory dedicated to different data types for quick access by the renderer. In some embodiments, the tile access protocol module is configured to use a dataset MQT to be downloaded from the server as a binary object and directly used to record the download and cache status of individual tiles at high speed. In some embodiments, the system includes tile streaming, tile caching, subscription-based services, and automatic updating.

In some embodiments, the system includes a shape/loop module. In some embodiments, the shape/loop module operates in a flat 2D space, typically X/Y space or Lat/Lon (Latitude/Longitude) space. In some embodiments, the system is designed to resolve complicated stenciling problems useful for a number of purposes, especially processing image and terrain data into tiles. In some embodiments, the system is configured to create new image and terrain data by combining multiple and different data sources while applying complicated inclusion/exclusion stencil operations. In some embodiments, the geographical extent of valid data is defined and represented as a system defined shape, which is a combination of new source data areas, existing subject dataset areas, and an external user stencil, all represented by shapes. In some embodiments, the system enables the creation of sophisticated GIS layers.

Figure 8:
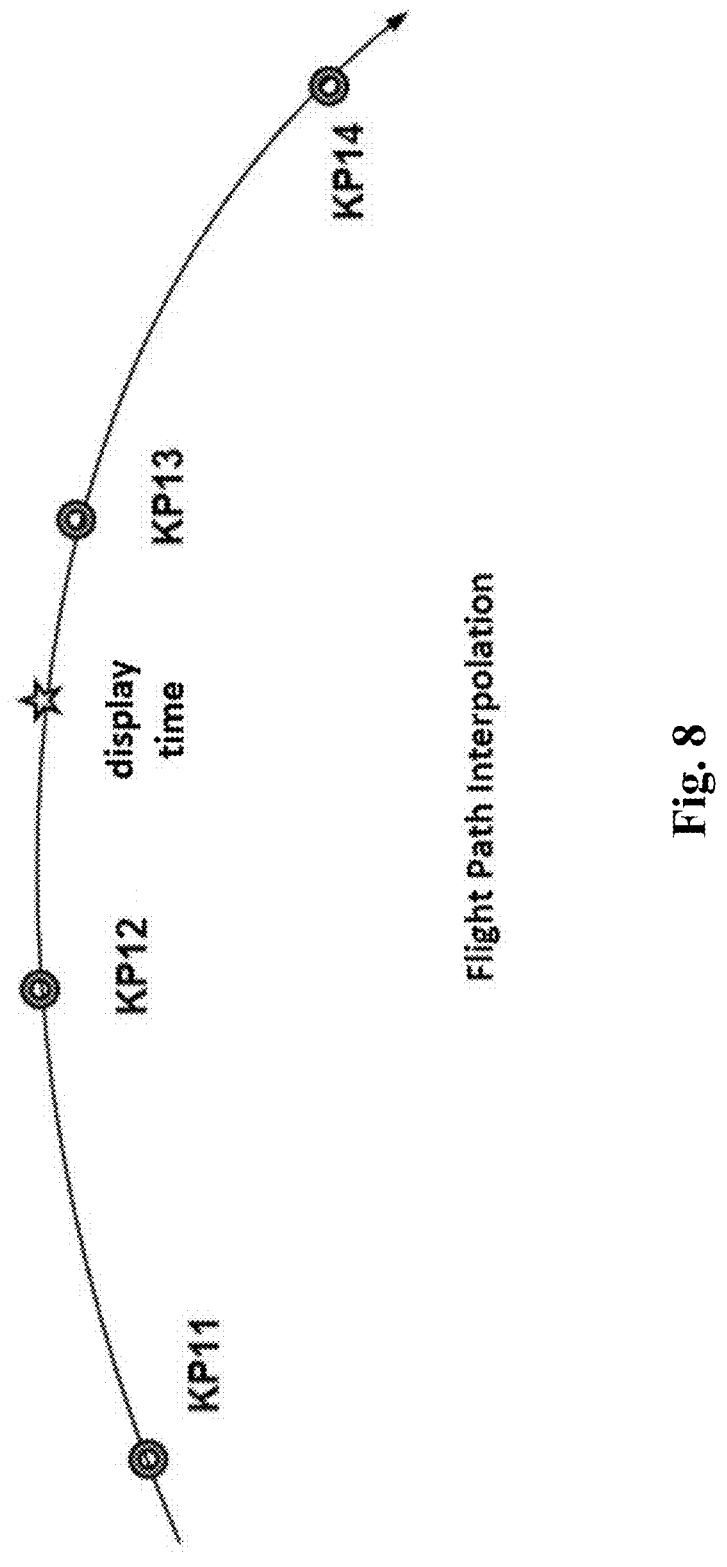
FIG. 8 illustrates flight path interpolation according to some embodiments.

In some embodiments, the system includes an aircraft tracking module. In some embodiments, the aircraft tracking module includes interpolated tracking of an aircraft. In some embodiments, the aircraft tracking module is configured to track aircraft position and heading based on creating an interpolated flight path using avionics flight data. In some embodiments, implementations of one or more portions of the system described herein when implementing the aircraft tracking module results in a resistance to flight data errors, delays, and interruptions, as is common in the prior art. In some embodiments, the system enables a positive user experience for airline passengers while tracking aircraft flight from origin to destination. FIG. 8 illustrates flight path interpolation according to some embodiments.

Figure 9:
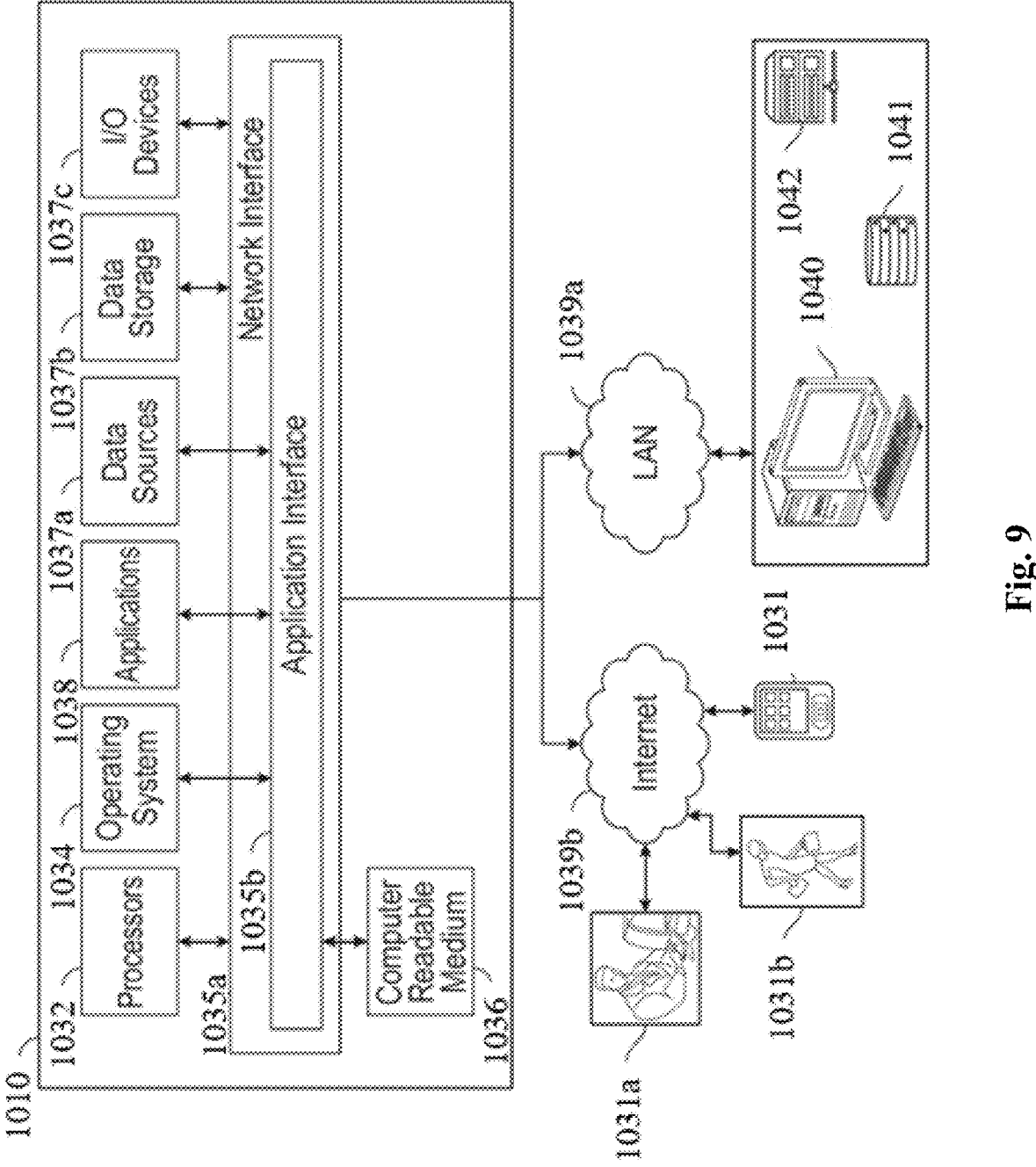
FIG. 9 illustrates a computer system enabling or comprising the systems and methods in accordance with some embodiments of the system.

FIG. 9 illustrates a computer system 1010 enabling or comprising the systems and methods in accordance with some embodiments of the system. In some embodiments, the computer system 1010 can operate and/or process computer-executable code of one or more software modules of the aforementioned system and method. Further, in some embodiments, the computer system 1010 can operate and/or display information within one or more graphical user interfaces (e.g., HMIs) integrated with or coupled to the system.

In some embodiments, the computer system 1010 can comprise at least one processor 1032. In some embodiments, the at least one processor 1032 can reside in, or coupled to, one or more conventional server platforms (not shown). In some embodiments, the computer system 1010 can include a network interface 1035a and an application interface 1035b coupled to the least one processor 1032 capable of processing at least one operating system 1034. Further, in some embodiments, the interfaces 1035a, 1035b coupled to at least one processor 1032 can be configured to process one or more of the software modules (e.g., such as enterprise applications 1038). In some embodiments, the software application modules 1038 can include server-based software and can operate to host at least one user account and/or at least one client account, and operate to transfer data between one or more of these accounts using the at least one processor 1032.

With the above embodiments in mind, it is understood that the system can employ various computer-implemented operations involving data stored in computer systems. Moreover, the above-described databases and models described throughout this disclosure can store analytical models and other data on computer-readable storage media within the computer system 1010 and on computer-readable storage media coupled to the computer system 1010 according to various embodiments. In addition, in some embodiments, the above-described applications of the system can be stored on computer-readable storage media within the computer system 1010 and on computer-readable storage media coupled to the computer system 1010. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 1010 can comprise at least one computer readable medium 1036 coupled to at least one of at least one data source 1037a, at least one data storage 1037b, and/or at least one input/output 1037c. In some embodiments, the computer system 1010 can be embodied as computer readable code on a computer readable medium 1036. In some embodiments, the computer readable medium 1036 can be any data storage that can store data, which can thereafter be read by a computer (such as computer 1040). In some embodiments, the computer readable medium 1036 can be any physical or material medium that can be used to tangibly store the desired information or data or instructions and which can be accessed by a computer 1040 or processor 1032. In some embodiments, the computer readable medium 1036 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 1036 can transmit or carry instructions to a remote computer 1040 and/or at least one user 1031, including a router, private or public network, or other transmission or channel, both wired and wireless. In some embodiments, the software application modules 1038 can be configured to send and receive data from a database (e.g., from a computer readable medium 1036 including data sources 1037a and data storage 1037b that can comprise a database), and data can be received by the software application modules 1038 from at least one other source. In some embodiments, at least one of the software application modules 1038 can be configured within the computer system 1010 to output data to at least one user 1031 via at least one graphical user interface rendered on at least one digital display.

In some embodiments, the computer readable medium 1036 can be distributed over a conventional computer network via the network interface 1035a where the system embodied by the computer readable code can be stored and executed in a distributed fashion. For example, in some embodiments, one or more components of the computer system 1010 can be coupled to send and/or receive data through a local area network ("LAN") 1039a and/or an internet coupled network 1039b (e.g., such as a wireless internet). In some embodiments, the networks 1039a, 1039b can include wide area networks ("WAN"), direct connections (e.g., through a universal serial bus port), or other forms of computer-readable media 1036, or any combination thereof.

In some embodiments, components of the networks 1039a, 1039b can include any number of personal computers 1040 which include for example desktop computers, and/or laptop computers, or any fixed, generally non-mobile internet appliances coupled through the LAN 1039a. For example, some embodiments include one or more of personal computers 1040, databases 1041, and/or servers 1042 coupled through the LAN 1039a that can be configured for any type of user including an administrator. Some embodiments can include one or more personal computers 1040 coupled through network 1039b. In some embodiments, one or more components of the computer system 1010 can be coupled to send or receive data through an internet network (e.g., such as network 1039b). For example, some embodiments include at least one user 1031a, 1031b, is coupled wirelessly and accessing one or more software modules of the system including at least one enterprise application 1038 via an input and output ("I/O") 1037c. In some embodiments, the computer system 1010 can enable at least one user 1031a, 1031b, to be coupled to access enterprise applications 1038 via an I/O 1037c through LAN 1039a. In some embodiments, the user 1031 can comprise a user 1031a coupled to the computer system 1010 using a desktop computer, and/or laptop computers, or any fixed, generally non-mobile internet appliances coupled through the internet 1039b. In some embodiments, the user can comprise a mobile user 1031b coupled to the computer system 1010. In some embodiments, the user 1031b can connect using any mobile computing 1031c to wireless coupled to the computer system 1010, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of geospatial rendering by implementing a hybrid projection that eliminates polar distortion. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Any text in the drawings is part of the system's disclosure and is understood to be readily incorporable into any description of the metes and bounds of the system. Any functional language in the drawings is a reference to the system being configured to perform the recited function, and structures shown or described in the drawings are to be considered as the system comprising the structures recited therein. It is understood that defining the metes and bounds of the system using a description of images in the drawing does not need a corresponding text description in the written specification to fall with the scope of the disclosure.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system. The phrase "configured to" also denotes the step of configuring a structure or computer to execute a function in some embodiments.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable, and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for geospatial rendering comprising:
one or more processors; and
memory storing thereon instructions that, as a result of being executed by the one or more processors, cause the system to:
subdivide a digital globe associated with a planet into a set of polar faces and a set of equatorial globe faces, wherein the set of polar faces is generated according to a square polar projection, wherein the set of equatorial globe faces is generated according to a geographic projection, and wherein the set of polar faces and the set of equatorial globe faces are delineated according to a latitudinal range;

perform quadtree tessellation of the set of polar faces to generate a set of polar quads, wherein the set of polar quads is generated according to the square polar projection;

perform quadtree tessellation of the set of equatorial globe faces to generate a set of equatorial globe quads, wherein the set of equatorial globe quads is generated according to the geographic projection, and wherein the set of equatorial globe quads and the set of polar quads are generated to have a same area;

assign face coordinates to the set of polar quads and the set of equatorial globe quads, wherein the face coordinates are used to identify quads on the digital globe and associated with the set of polar faces and the set of equatorial globe faces;

combine multiple image, terrain, vector, or annotation datasets at runtime to generate geospatial content associated with the planet and a geographical coordinate system; and render the geospatial content along the set of polar quads and the set of equatorial globe quads, wherein the geospatial content is rendered according to the face coordinates and the geographical coordinate system.

2. The system of claim 1, wherein the latitudinal range is between 45 degrees south of an equator of the planet and 45 degrees north of the equator.

3. The system of claim 1, wherein:

a face coordinate corresponding to a quad includes a face value, a level value, a row value, and a column value;

the face value identifies a face from the set of polar faces and the set of equatorial globe faces;

the level value denotes a recursion level; and the row value and the column value identify the quad.

4. The system of claim 1, wherein the instructions further cause the system to:

perform terrain morphing between different resolution levels according to the quads and the geospatial content, wherein the terrain morphing is performed using a level-of-detail algorithm.

5. The system of claim 1, wherein the square polar projection does not include a spherical network of parallels and meridians.

6. The system of claim 1, wherein the digital globe is represented by a cube structure, and wherein a set of sides of the cube structure are subdivided to define the set of polar faces and the set of equatorial globe faces.

7. The system of claim 1, wherein the geospatial content is generated by further applying a set of inclusion/exclusion stencil operations to image and terrain data to generate a set of tiles applicable to the quads.

8. A computer-implemented method, comprising:

subdividing a digital globe associated with a planet into a set of polar faces and a set of equatorial globe faces, wherein the set of polar faces is generated according to a square polar projection, wherein the set of equatorial globe faces is generated according to a geographic projection, and wherein the set of polar faces and the set of equatorial globe faces are delineated according to a latitudinal range;

performing quadtree tessellation of the set of polar faces to generate a set of polar quads, wherein the set of polar quads is generated according to the square polar projection;

performing quadtree tessellation of the set of equatorial globe faces to generate a set of equatorial globe quads, wherein the set of equatorial globe quads is generated according to the geographic projection, and wherein the set of equatorial globe quads and the set of polar quads are generated to have a same area;

assigning face coordinates to the set of polar quads and the set of equatorial globe quads, wherein the face coordinates are used to identify quads on the digital globe and associated with the set of polar faces and the set of equatorial globe faces;

combining multiple image, terrain, vector, or annotation datasets at runtime to generate geospatial content associated with the planet and a geographical coordinate system; and rendering the geospatial content along the set of polar quads and the set of equatorial globe quads, wherein the geospatial content is rendered according to the face coordinates and the geographical coordinate system.

9. The computer-implemented method of claim 8, wherein the latitudinal range is between 45 degrees south of an equator of the planet and 45 degrees north of the equator.

10. The computer-implemented method of claim 8, wherein:

a face coordinate corresponding to a quad includes a face value, a level value, a row value, and a column value;

the face value identifies a face from the set of polar faces and the set of equatorial globe faces;

the level value denotes a recursion level; and the row value and the column value identify the quad.

11. The computer-implemented method of claim 8, further comprising:

performing terrain morphing between different resolution levels according to the quads and the geospatial content, wherein the terrain morphing is performed using a level-of-detail algorithm.

12. The computer-implemented method of claim 8, wherein the square polar projection does not include a spherical network of parallels and meridians.

13. The computer-implemented method of claim 8, wherein the digital globe is represented by a cube structure, and wherein a set of sides of the cube structure are subdivided to define the set of polar faces and the set of equatorial globe faces.

14. The computer-implemented method of claim 8, wherein the geospatial content is generated by further applying a set of inclusion/exclusion stencil operations to image and terrain data to generate a set of tiles applicable to the quads.

15. A non-transitory computer-readable storage medium storing thereon executable instructions that, as a result of being executed by one or more processors of a computer system, cause the computer system to:

subdivide a digital globe associated with a planet into a set of polar faces and a set of equatorial globe faces, wherein the set of polar faces is generated according to a square polar projection, wherein the set of equatorial globe faces is generated according to a geographic projection, and wherein the set of polar faces and the set of equatorial globe faces are delineated according to a latitudinal range;

perform quadtree tessellation of the set of polar faces to generate a set of polar quads, wherein the set of polar quads is generated according to the square polar projection;

perform quadtree tessellation of the set of equatorial globe faces to generate a set of equatorial globe quads, wherein the set of equatorial globe quads is generated according to the geographic projection, and wherein the set of equatorial globe quads and the set of polar quads are generated to have a same area;

assign face coordinates to the set of polar quads and the set of equatorial globe quads, wherein the face coordinates are used to identify quads on the digital globe and associated with the set of polar faces and the set of equatorial globe faces;

combine multiple image, terrain, vector, or annotation datasets at runtime to generate geospatial content associated with the planet and a geographical coordinate system; and render the geospatial content along the set of polar quads and the set of equatorial globe quads, wherein the geospatial content is rendered according to the face coordinates and the geographical coordinate system.

16. The non-transitory computer-readable storage medium of claim 15, wherein the latitudinal range is between 45 degrees south of an equator of the planet and 45 degrees north of the equator.

17. The non-transitory computer-readable storage medium of claim 15, a face coordinate corresponding to a quad includes a face value, a level value, a row value, and a column value;

the face value identifies a face from the set of polar faces and the set of equatorial globe faces;

the level value denotes a recursion level; and the row value and the column value identify the quad.

18. The non-transitory computer-readable storage medium of claim 15, wherein the executable instructions further cause the computer system to:

perform terrain morphing between different resolution levels according to the quads and the geospatial content, wherein the terrain morphing is performed using a level-of-detail algorithm.

19. The non-transitory computer-readable storage medium of claim 15, wherein the square polar projection does not include a spherical network of parallels and meridians.

20. The non-transitory computer-readable storage medium of claim 15, wherein the digital globe is represented by a cube structure, and wherein a set of sides of the cube structure are subdivided to define the set of polar faces and the set of equatorial globe faces.

21. The non-transitory computer-readable storage medium of claim 15, wherein the geospatial content is generated by further applying a set of inclusion/exclusion stencil operations to image and terrain data to generate a set of tiles applicable to the quads.

* * * * *